(12) United States Patent
Luehrsen et al.

(10) Patent No.: US 8,140,238 B2
(45) Date of Patent: Mar. 20, 2012

(54) DETECTION AND CONTROL OF POWER INDUCED HOP DURING TRACTION CONTROL IN A VEHICLE

(75) Inventors: Eric Luehrsen, Dearborn, MI (US); Michael Glenn Fodor, Dearborn, MI (US); Don Perlick, Farmington Hills, MI (US); Daniel Dunn, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1180 days.

(21) Appl. No.: 11/925,640

(22) Filed: Oct. 26, 2007

(65) Prior Publication Data

US 2009/0107747 A1 Apr. 30, 2009

(51) Int. Cl.
*B60K 28/16* (2006.01)

(52) U.S. Cl. .......................................... 701/82; 180/197

(58) Field of Classification Search .............. 701/69–70, 701/82, 86–91; 180/197, 183–185
See application file for complete search history.

(56) References Cited

U.S. PATENT DOCUMENTS

| | | | |
|---|---|---|---|
| 5,090,511 A | | 2/1992 | Kabasin |
| 5,163,530 A | * | 11/1992 | Nakamura et al. ............ 180/197 |
| 5,183,127 A | | 2/1993 | Kageyamaa et al. |
| 5,193,889 A | | 3/1993 | Schaefer et al. |
| 5,224,044 A | | 6/1993 | Tamura et al. |
| 5,265,693 A | | 11/1993 | Rees et al. |
| 5,373,447 A | | 12/1994 | Howes et al. |
| 5,469,359 A | | 11/1995 | Tsuyama et al. |
| 5,471,386 A | * | 11/1995 | Hrovat et al. ................... 701/82 |
| 5,628,378 A | | 5/1997 | Saito et al. |
| 5,735,362 A | | 4/1998 | Hrovat et al. |
| 5,765,657 A | | 6/1998 | Fukumura et al. |
| 5,952,564 A | | 9/1999 | Naito et al. |
| 5,957,991 A | | 9/1999 | Yasuda |
| 6,050,652 A | | 4/2000 | Kolbe et al. |
| 6,128,568 A | | 10/2000 | Sasaki |
| 6,269,297 B1 | | 7/2001 | Hosomi et al. |
| 6,314,342 B1 | | 11/2001 | Kramer et al. |
| 6,401,853 B1 | | 6/2002 | Turski et al. |
| 6,591,178 B2 | | 7/2003 | Krueger et al. |
| 6,952,637 B2 | | 10/2005 | Barron et al. |
| 7,448,983 B2 | * | 11/2008 | Doering et al. ............... 477/183 |
| 7,571,044 B2 | * | 8/2009 | Brown et al. ................... 701/91 |
| 7,653,471 B2 | * | 1/2010 | Mattson et al. ................. 701/83 |

(Continued)

FOREIGN PATENT DOCUMENTS

DE 69009586 T2 9/1994

(Continued)

OTHER PUBLICATIONS

ISA, United Kingdom Intellectual Property Office, International Search Report of GB0819740.2, Jan. 21, 2009, 1 page.

(Continued)

*Primary Examiner* — Yonel Beaulieu
(74) *Attorney, Agent, or Firm* — Fredrick Vernon Owens; Alleman Hall McCoy Russell & Tuttle LLP

(57) ABSTRACT

A method for controlling a powertrain of a vehicle with wheels during a traction control event is provided. The method comprises adjusting wheel torque in response to an amplitude of a band-pass filtered driven wheel speed and a direction of acceleration of driven wheels.

18 Claims, 5 Drawing Sheets

U.S. PATENT DOCUMENTS

| | | | |
|---|---|---|---|
| 2004/0015279 A1 | 1/2004 | Barron et al. |
| 2004/0098188 A1 | 5/2004 | Priemer et al. |
| 2004/0211609 A1 | 10/2004 | Schmitt |
| 2006/0052908 A1 | 3/2006 | Matsumoto et al. |
| 2006/0080022 A1 | 4/2006 | Hrovat et al. |
| 2006/0080023 A1 | 4/2006 | Hrovat et al. |
| 2006/0144598 A1 | 7/2006 | Johnson, IV |
| 2006/0149445 A1 | 7/2006 | Suzumura et al. |
| 2006/0158031 A1 | 7/2006 | Kummel et al. |
| 2007/0027606 A1 | 2/2007 | Fodor et al. |
| 2008/0249689 A1 | 10/2008 | Matsumoto et al. |
| 2009/0107748 A1 | 4/2009 | Luehrsen et al. |
| 2009/0112437 A1 | 4/2009 | Luehrsen et al. |

FOREIGN PATENT DOCUMENTS

| | | |
|---|---|---|
| DE | 102005033354 A1 | 3/2006 |
| EP | 1533171 | 5/2005 |
| EP | 1978278 | 10/2008 |
| GB | 2394311 | 4/2004 |
| GB | 2446419 | 8/2008 |
| JP | 11351367 | 12/1999 |
| WO | 2008/050782 | 5/2008 |
| WO | 2009/002442 | 12/2008 |

OTHER PUBLICATIONS

ISA, United Kingdom Intellectual Property Office, International Search Report of GB0819735.2, Jan. 28, 2009, 1 page.

ISA Intellectual Property Office, International Search Report of GB0817399.9, Apr. 16, 2009, United Kingdom.

ISA Intellectual Property Office, International Search Report of GB0817399.9, Jul. 10, 2009, United Kingdom, 2 pages.

ISA Intellectual Property Office, International Search Report of GB0817399.9, Jul. 10, 2009, United Kingdom, 1 page.

U.S. Appl. No. 11/926,516, filed Oct. 29, 2007, Luehrsen et al.

U.S. Appl. No. 11/928,103, filed Oct. 30, 2007, Luehrsen et al.

\* cited by examiner

DETECTION AND CONTROL OF POWER INDUCED HOP DURING TRACTION CONTROL IN A VEHICLE

FIELD OF INVENTION

The present application relates to the traction control of a vehicle, and more specifically, relates to mitigation of power induced hop during traction control.

BACKGROUND

In traction control operation, control of wheel slip on certain road surfaces may interact with natural frequencies in the driveline or suspension, which may be referred to as power induced "hop". Hop resonances are caused by interactions between tire, road, and suspension components.

On typical road surfaces, the transfer of engine power into vehicle acceleration and frictional losses at the tire keeps the amplitude of the hop resonance relatively low. However, the hop resonance may increase to a troublesome level on certain road surfaces. For example, on an asphalt surface with a thin layer of standing water, the friction coefficient ($\mu$) and surface torque capacity may change significantly with respect to wheel slip and suspension loading. When a tire has full suspension force acting on it, the tire-road frictional torque capacity may be at a desired value for normal traction control and vehicle operation. As the suspension unloads the tire (for various reasons including surface roughness), water may be present between the road surface and tire, causing a loss of frictional torque capacity. Because the suspension may quickly unload the tire in the fore/aft direction, the thickness of the water layer between the tire and road may be altered. As a result, the tire-road frictional torque capacity may be varied. This cyclical interaction may excite the normally insignificant suspension vibration or hop resonance, and initiate significant oscillatory wheel acceleration, causing the wheels, or even the entire vehicle, to bounce. Without mitigation, the traction control system may further excite the vehicle system by way of in-phase powertrain torque response to the oscillating wheel acceleration. Excitation of hop may correspond to an increase in vehicle noise, vibration, and harshness (NHV) and a potential durability concern.

One solution to control the power-induced hop may include stopping the unwanted acceleration and deceleration by applying counter-phase torque. However, the implementation of such actions may require a fast hop detecting or computing device and/or well-tuned, fast-acting, actuating components. Consequently, it may be cost prohibitive for mass produced vehicles, such as those using traction control via engine torque reduction without brake actuation.

SUMMARY OF THE INVENTION

According to one aspect, a method for controlling a powertrain of a vehicle with wheels during a traction control event is provided. The method comprises adjusting wheel torque in response to an amplitude of a band-pass filtered driven wheel speed and a direction of acceleration of driven wheels. In one example, the amplitude of the band-pass filtered driven wheel speed provides an indication of hop, which can then be used to provide asymmetric torque control based on the direction of wheel acceleration. Specifically, by considering the direction of wheel acceleration, the torque control can reduce torque adjustments that contribute to the hop oscillation, and better damp the vibrations. In this way, it may be possible to utilize engine-based torque adjustments to reduce hop phenomenon effectively.

Note that the above approach may be applied specifically to engine-torque-reduction-based traction control without using wheel braking torque, although wheel braking torque may also be used.

According to another aspect, a method for controlling a powertrain of a vehicle with wheels during a traction control event is provided. The method comprises detecting a hop level by processing signals of driven wheel speed; adjusting wheel torque in a first direction and in a first proportion to a wheel slip change when an acceleration of driven wheels is greater than zero; and adjusting the wheel torque in a second direction and in a second proportion to the wheel slip change when the acceleration is less than zero, wherein the second proportion is adjusted responsive to the hop level.

According to yet another aspect, a method for controlling a powertrain of a vehicle with wheels during a traction control event is provided. The method comprises adjusting wheel torque responsive to a gain, a wheel speed error, and an acceleration of driven wheels, where the gain is adjusted based on a hop level, a direction of the wheel speed error, and a direction of the acceleration.

The methods described above may prevent or reduce power induced hop during traction control. For example, the methods may reduce the wheel torque adjustment as the hop level increases, even as the wheels decelerate. In this way, the wheel speed is encouraged to return to a slip level desired for reducing the hop. Thus, wheel hop may not be excited by the powertrain control system.

DETAILED DESCRIPTION OF THE PREFERRED EMBODIMENTS

Figure 1:
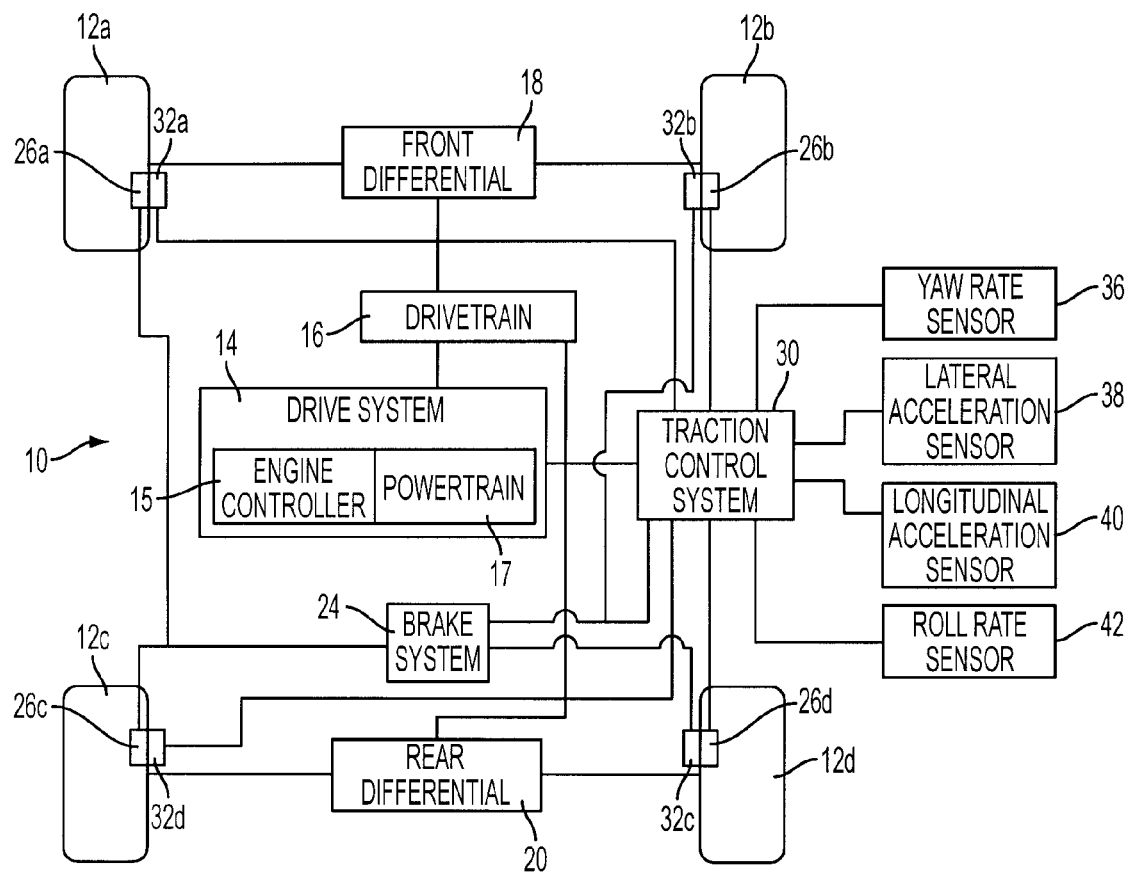
FIG. 1 is a block diagram of a vehicle having a traction control system.

FIG. 1 is a block diagram of a vehicle 10 having a traction control system. As shown in FIG. 1, vehicle 10 may comprise wheel and tire assemblies 12a, 12b, 12c, and 12d. A drive system 14 coupled to a drivetrain 16 may provide power to the wheel and tire assemblies 12a-d through a front differential 18 and rear differential 20. Drive system 14 may include an engine controller 15 and a powertrain 17. Engine controller 15 may be a microprocessor-based system. Powertrain 17 may provide power by a power generating unit, such as an internal combustion engine, a hybrid electric system, an electric drive system, or a fuel cell system. Engine controller 15 may control the amount of torque and thus the amount of slip generated at each of the wheels. Drive system 14 may vary the amount of power output to effect a change in torque at wheel and tire assemblies 12*a-d*.

Drive system 14 may provide torque through drivetrain 16, which may include a transmission, front differential 18 and rear differential 20. In a rear wheel drive vehicle, only the rear differential 20 would be present. A four wheel or all-wheel drive system may include both front differential 18 and rear differential 20. Further, in certain all-wheel drive system, an additional center differential may be provided.

Vehicle 10 may include a brake system 24 to actuate brakes 26*a*, 26*b*, 26*c*, and 26*d*. A brake system 24 may include an electric, electro-hydraulic, or hydraulic system. The brakes are activated in response to a driver input.

Vehicle 10 may also include a traction control system 30. Traction control system 30 may be coupled to drive system 14 and coupled directly or indirectly to wheel speed sensors 32*a*, 32*b*, 32*c*, and 32*d*. Traction control system 30 may generate a control signal or torque command to reduce the amount of torque to the engine upon sensing a slipping wheel. In some embodiments, traction control system 30 may also generate a braking command to increase wheel braking upon sensing a slipping wheel from the wheel speed sensors.

Wheel speed sensors may provide information for traction control among other purposes. For example, wheel speed measured by the wheel speed sensors may be processed by a powertrain control system to detect a hop occurrence and/or determine a hop level. As shown in FIG. 1, wheel speed sensors 32*a*, 32*b*, 32*c*, and 32*d* may be coupled directly to the wheels. In some embodiments, the wheel speed signals may be the output from an anti-lock brake system, an axle sensor, etc.

Additionally, various dynamic sensors may be coupled to traction control system 30. Dynamic sensors may include a yaw rate sensor 36, a lateral acceleration sensor 38, and a longitudinal acceleration sensor 40. Yaw rate sensor 36 generates a yaw rate signal corresponding to the yaw rate of the vehicle. From yaw rate sensor 36, the yaw acceleration may also be determined. Lateral acceleration sensor 38 generates a lateral acceleration signal corresponding to the lateral acceleration of the vehicle body. Longitudinal acceleration sensor 40 generates a longitudinal acceleration signal corresponding to the longitudinal acceleration of the vehicle. The various sensors may be directly coupled to various vehicle dynamic control systems, such as a yaw control system or a rollover stability control system. A roll rate sensor 42 may also be used to determine load transfer for the vehicle.

Figure 2:
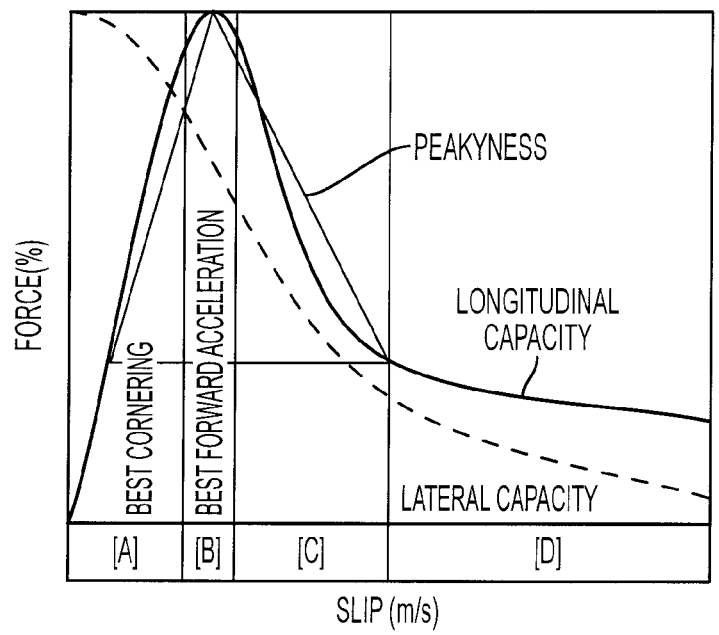
FIG. 2 schematically shows a relationship between surface-tire interaction and slip speed, illustrating surface torque capacity.

FIG. 2 schematically shows a relationship between surface-tire interaction and slip speed, illustrating surface torque capacity. The solid line shows a curve depicting the change of surface torque capacity with the slip speed (meter/second). The dashed line shows the change of force with the slip speed. As shown by FIG. 2, Zone A has low slip speed and high surface-tire interaction or force. Zone A represents the normal driving condition slip for forward acceleration. The surface torque capacity is responsive to a powertrain torque output. As slip speed increases, surface torque capacity increases. Zone B has a break away peak and shows a region having high surface torque capacity. Zone B represents the best forward acceleration conditions. The actual surface torque capacity may be indicated by the friction coefficient ($\mu$). From a peak point in Zone B to the entire Zone C, traction control may be enabled to maintain vehicle control as the slip increases. Traction control is operated to reduce the slip at or under a base slip target. Thus, as the slip increases, surface torque capacity decreases at a stable-slope. Zone D is the region where the wheels free-spin more or less.

At any given $\mu$, the actual shape and slope of the curve may be different. A surface with an extremely steep slope or where dynamic forces change the position of the peak may be referred to as a peaky-surface. These types of surfaces can excite natural frequencies in the driveline or suspension and cause significant hop of a vehicle. One example of peaky-surface is a sealed asphalt road with a thin layer of standing water.

Control of power induced hop may include controlling wheel slip within an appropriate zone. As described in detail below, a control strategy may include an algorithm related to the boundary of the zones. For example, in one approach, a touchdown (zero slip) protection torque may be added to the wheel torque when the wheel slip is in Zone A.

Figure 3:
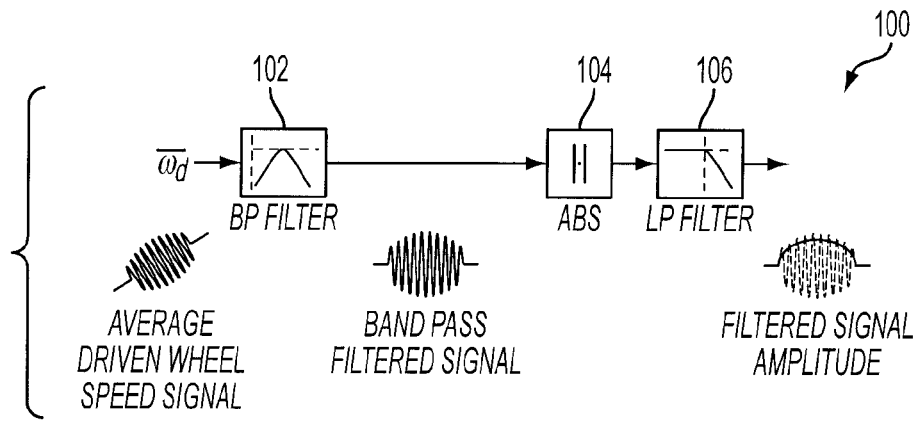
FIG. 3 shows a block diagram of an example hop detecting method to process wheel speed signals and determine a hop level according to the present disclosure.

Hop control may depend on the detection of a hop occurrence and a hop level. The hop may appear as a distinct sinusoidal signal superimposed on the average driven wheel speed. However, the internal engine based powertrain system may not have sufficient bandwidth to detect the hop and subsequently control the vibrating mode or the hop magnitude directly through torque control. FIG. 3 shows a block diagram of an example hop detecting method 100 to process wheel speed signals and determine the hop level that isolates the sinusoidal components of the average driven wheel speed. In some embodiments, hop detecting method 100 may include a band pass filter 102 to filter the average wheel speed at a wheel hop frequency, an absolute value function 104 to take an absolute value of the band-pass filtered signals, and a low pass filter 106 to determine the amplitude of the signal output from absolute value function component 104. The amplitude may be indicative of the hop level or the hop magnitude.

In some embodiments, band pass filter 102 may be a second-order band pass filter. Assuming a resonance frequency (omega, $\omega$) and a desired admitting band width (zeta, $\zeta$) are fixed, the band pass filter with a bilinear form in the continuous (Laplace) space is as follows:

$$\frac{o}{i} = \frac{2\xi\omega S}{S^2 + \xi\omega S + \omega^2} \tag{1}$$

where o is an output; i is an input; and S is the Laplace operator. In some embodiments, the frequency, $\omega$, may be a fixed value calibrated for specific types of vehicle. Alternatively, the frequency may be tuned based on vehicle operating conditions in addition to the vehicle configuration.

To use the above filter in a discrete computational setting, its z-transform may take the following form:

$$\frac{o}{i} = \frac{N(Z^2 + (0) - 1)}{D_2 Z^2 + D_1 k_2 + D_0 k_3} \tag{2}$$

where Z is a discrete space operator; Terms N, $D_0$, $D_1$, and $D_2$ are the result of standard bilinear substitution. In the discrete space, some improvements and optimizations may be used. As shown by the above equation, the bilinear transform input (numerator) may be shifted so that inputs (0) and (1) are used instead of (0) and (2) which are used in some band pass filters. In some embodiments, the Z-transformation may be modified as follow:

$$\frac{o}{i} = \frac{(2 - \Delta t \cdot \omega / 12) \cdot (4\xi\omega \cdot \Delta t) \cdot (Z^2 - Z - 0)}{(\omega^2 \Delta t^2 + 4\xi\omega\Delta t + 4) \cdot Z^2 +} \quad (3)$$
$$(2\omega^2 \Delta t^2 - 8) \cdot Z + (\omega^2 \Delta t^2 - 4\xi\Delta t + 4)$$

In some embodiments, a gain may be applied to compensate for distance across two loops rather than one.

Because actual wheel acceleration is structurally limited and the measurement system is discrete (tooth-edge-timing), aliasing is not a concern in the transform described above. In some embodiments, a wheel speed sampling frequency may be approximately an order of magnitude higher than the wheel hop frequency. In some embodiments, hop detecting method 100 may be operated at the same rate at which wheel speed signals are communicated to the powertrain control system. The transformations described above may thus allow hop detecting method 100 to obtain reliable information on the hop occurrence while running at a slower sample rate. In this way, hop detecting method 100 may be implemented in the powertrain control system in a vehicle to control the hop during traction control without use of additional costly computing devices and higher sample rate processors.

Continuing with FIG. 3, the filtered band-pass signals may be passed through absolute function 104 to obtain absolute value of the filtered signals. Then, the amplitude of the filtered wheel speed signals may be determined at low pass filter 106. The amplitude may be expressed in root mean square, $A_{rms}$. In some embodiments, low pass filter 106 may be a first-order filter. An equation for the first-order filter in a discrete space may be expressed as follows:

$$\frac{o}{i} = \frac{f}{Z - (1-f)} = \frac{\Delta t \cdot \omega / 2\pi}{1 - (1 - \Delta t \cdot \omega / 2\pi)} \quad (4)$$

where the frequency of the low pass filter is:

$$f = \Delta t \cdot \omega / 2\pi \quad (5)$$

Alternatively, low pass filter 106 may be configured as an asymmetrical first order filter with two calibrateable time constants based on the direction of change of hop level. For example, when the detected amplitude (i.e., the hop indication) is increasing, the speed to process or output the amplitude from low pass filter 106 may need to increase quickly for fast hop detection and subsequent hop mitigation. The frequency of the first order filter as described in equation (5) may be used. When the detected amplitude is decreasing, the output speed of low pass filter 106 may reduce relatively slowly. The filter frequency may be determined as below:

$$f = \Delta t \cdot \omega / 4\pi^2 \quad (6)$$

With the asymmetrical filter, signal amplitude as a hop indication may be more useful for mitigation purposes. Further, the modified first-order filter may assist the control memory. It should be noted that, omega ($\omega$) and zeta ($\xi$) may be a function of various variables, such as road surface conditions, vehicle operating conditions, and vehicle configuration. In some embodiments, the road surface condition may include a friction coefficient of surface-tire ($\mu$). The vehicle operating condition may include vehicle speed of driven wheel or drive wheel, acceleration, etc. The vehicle configuration may include transmission gear ratio, estimated vehicle weight, dominating force change component, dominating inertia change component, etc. The omega ($\omega$) and zeta ($\xi$) may be determined from a map or polynomials including the above variables.

Further, it should be appreciated that there may be a difference between a single wheel hop, opposing wheel hop, and synchronous wheel hop. While these frequencies are slightly different, it may be possible to have one filter with a wide band. Under some conditions, the hop may be of such magnitude that an amplitude in itself may be a distinguishing characteristic. Moreover, it should be appreciated that the filters of hop detecting method 100 may be configured to be self-tuning with a center frequency. By selecting the center frequency and band-width, hop detecting method 100, as implemented by the powertrain control system of the vehicle, may calculate all the discrete filter terms and necessary correction or modification factors. Thus, if the center-frequency is dynamic with the variables described above, the filter parameters (e.g. frequency or band-width) may be adjusted during vehicle operation.

Furthermore, it should be noted that the embodiment depicted in FIG. 3 is one example implementation, and various other or alternative filters may be used.

Hop detecting method 100 may have several advantages. For example, the filter may separate out the desired band signals at low sampling rates when the band-width includes a significant portion of under sampled data. In one example, when the center frequency is sampled at a spacing of 1.5+ radians, useful data may be obtained. In this way, the cost to implement the hop detecting method in a vehicle can be reduced. Further, the hop detecting method allows dynamic tuning of the filter by allowing a higher frequency selection without disabling or reducing the effects of the filter. Moreover, the hop detection method may provide calibration flexibility to indicate the amplitude of all wheel hop modes for all gears and surfaces, for all build combinations associated with a single powertrain control module flash image.

Figure 4:
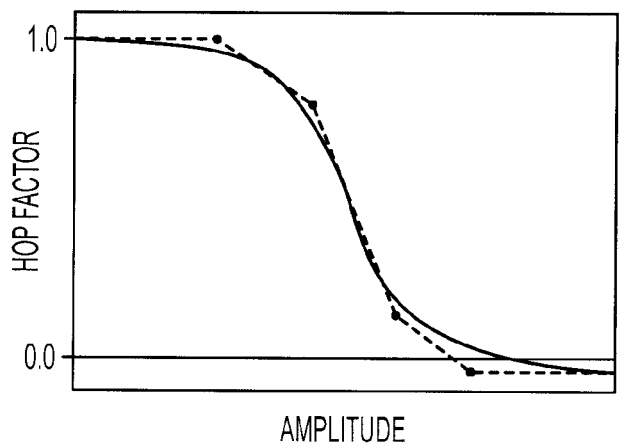
FIG. 4 shows an example relationship of the hop factor with the amplitude of hop level.

The amplitude determined by hop detecting method 100 may be used to determine a hop factor for hop control. FIG. 4 shows an example relationship of the hop factor with the amplitude of the band-filtered wheel signals or the hop level. As described above, the hop resonance may be relatively small during a traction control event. For example, the amplitude of the hop resonance may be less than 2.0 kph. However, on some surfaces, the amplitude may reach a level that is of significant concern in terms of driver feel and vehicle NHV. The surface may be a "peaky" surface as described with reference to FIG. 2. Under some conditions, the amplitude may reach a level greater than 10.0 kph.

The hop factor may be in a range of 0.0 to 1.0. However, as shown in FIG. 4, in some embodiments, the hop factor may be negative. The relationship in FIG. 4 may be determined experimentally or calibrated for specific types of vehicles. In some embodiments, the relationship may be defined by an equation with parameters defining the foci or roll-off. Alternatively, a lookup table may be used to determine the hop factor. For example, the lookup table may have four-points with constant end extrapolation. In the depicted example, the hop factor decreases as the hop amplitude increases. In some embodiments, the hop factor may be incorporated into torque control to reduce the wheel torque. The wheel torque may be configured to decrease as the hop factor decreases or the hop level increases. Also, as shown in FIG. 4, the hop factor may be slightly negative. A negative hop factor may reduce the torque quickly to assist the driven wheels into tire-surface touchdown quickly (e.g., in Zone A shown in FIG. 2). At Zone A, the energy in the vehicle may be quickly grounded and the vibration may be reduced.

The hop factor may be used by the powertrain control system to control the hop using various approaches. In some embodiments, the hop control may be performed by modifying a base slip target. The base slip target is typically used for normal conditions during traction control. In some embodiments, the base slip target may be determined as a function of g and vehicle speed. The base slip target may be modified based on the hop factor. In one example, the base slip target is multiplied by the hop factor. In this way, the modified slip target decreases as the hop level increases. Thus, torque output from the powertrain can be reduced to prevent or mitigate the hop magnitude. Unlike conventional traction control system where the slip target is clipped to a minimum to mitigate minor NVH concerns, the modified slip target is not clipped to the minimum. In this way, the torque output may be reduced faster to stop unwanted acceleration or deceleration.

While the slip target modification described above may help ground the energy to reduce the hop level, the powertrain control system operated at normal traction control may continue to excite the resonance condition if the control mode is not properly modified. Thus, in addition to modifying the base slip target to reduce the hop level, in some embodiments, traction control modes may be further modified to prevent or reduce the magnitude of the hop. Torque control to reduce the hop level will be described in detail below.

Figure 5:
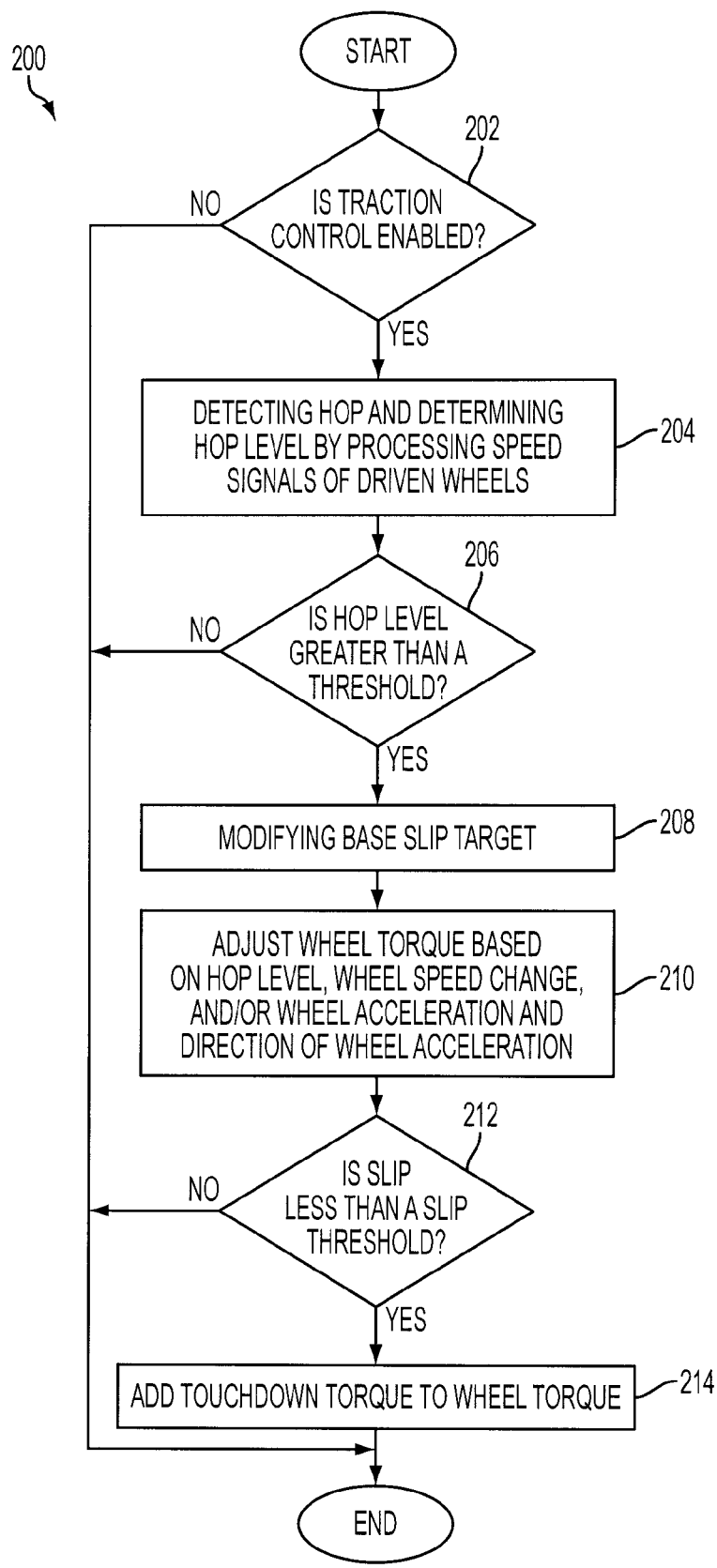
FIG. 5 is a flow chart of an example method to detect and control hop during a traction control event according to the present disclosure.

FIG. 5 is a flow chart of an example method 200 to detect and control hop during a traction control event. First, at 202, method 200 includes determining whether traction control is enabled. If the traction control is enabled, at 204, method 200 detects hop and determines the hop level by processing speed signals of driven wheels. The band pass filter, low pass filter, and associated computing device as described in detecting method 100 may be used to process the speed signals and determine the amplitude of wheel speed or the hop level.

As described above, the hop resonance may be present during a traction control event. Only a hop at high levels may cause concerns for vehicle operation and the vehicle components. Thus, at 206, method 200 includes determining whether the hop level is greater than a threshold. In some embodiments, the hop level may be indicated by the root mean square of the amplitude ($A_{rms}$) determined by the hop detecting method. The threshold may be a hop level where the hop resonance energy cannot be dissipated through vehicle acceleration and friction. Hop mitigation or hop control may be used when the threshold is exceeded.

If the hop level is greater than the threshold, at 208, method 200 may include modifying a base slip target. At some conditions, the hop may be controlled through target modification alone, such as reducing the slip speed target as hop level increases. As described above, the base slip target may be a function of the friction coefficient (μ) and wheel speed. In some embodiments, the slip target may be modified by multiplying the base slip target with a hop factor, $F_{hop}$.

It should be noted that the modified slip target may further be determined based on a road condition. For example, on a high μ surface, such as sand, the slip target may be increased when the hop level increases. However, on a low μ surface, such as ice, the slip target may be decreased as the hop level increases. Further, it should be noted that the slip target modification may be vehicle specific.

Furthermore, it should be appreciated that a rate of slip target modification may be configured to vary with the hop level and a direction of the hop changes. As described above, low pass filter 104 may be configured to quickly process the signals when the hop is expected to increase and to process the signals slowly when the hop is expected to decrease. Similarly, the slip target may be varied more quickly (e.g., at a faster rate of change) as the hop level rises up and varied less quickly as the hop level goes down. Thus, the hop may be controlled or mitigated effectively. In the meantime, the slip target may return to the normal operating condition smoothly.

Additionally, the hop may be further controlled by modifying control modes used for normal traction control. Thus, at 210, method 200 may include adjusting wheel torque based on the level of the hop, a wheel speed change, and/or wheel acceleration and a direction of wheel slip change and/or vehicle acceleration. In some embodiments, a proportional control mode may be modified to control the hop. In the proportional control mode during first-spin and excess flares, an extreme hop may not be likely on most vehicles. However, on some high-powered RWD vehicles, extreme hop may occur on high μ surfaces. One approach to prevent or reduce extreme hop may include dropping torque (or energy when multiplied by wheel speed) quickly. Thus, the hop-factor may be multiplied by the feed forward term of the proportional control mode. Since the slip target may also drop, the proportional term may be included in the control mode. The proportional control mode may be described by the following equation:

$$T_{wheel}=K_p \cdot (V_{target}-V_{driven})+K_\mu \cdot F_{hop} \cdot \mu \quad (7)$$

where $T_{wheel}$ is a wheel torque, $V_{target}$ is the slip target, and $K_p$ and $K_\mu$ are constants. With the proportional feed forward control mode described above, the significant hop in the first-spin (1-3 seconds of the traction control) for a high-performance vehicle may be prevented or mitigated during drag racing or similar conditions.

In some embodiments, an integral control mode may be used in traction control to reduce the hop level. In addition to the variables used in the proportional control, wheel acceleration may be incorporated into the integral control mode. The integral control mode according to the present disclosure will be described in detail below with reference to FIG. 7. Continuing with FIG. 5, at 212, method 200 may include determining whether a slip is less than a slip threshold. In some embodiments, the slip threshold may be a maximum slip in the Zone A in FIG. 2. Thus, at 212, method 200 determines whether the wheel slip is in the Zone A. If the wheel slip is in the Zone A, at 214, method 200 may include adding a touchdown torque to the wheel torque. It should be noted that it is desirable to operate the vehicle in Zone A if the extreme hop condition is detected. Thus, in both proportional mode and integral mode, a touchdown protection torque adder may be used. The control algorithm of the touchdown torque will be described in detail in FIG. 6.

The touchdown (near zero wheel slip) protection torque may include a timer under a minimum wheel slip, or in Zone A. The timer function of the touchdown protection torque may allow a touchdown device to work when the hop is transient, but a touchdown device to be removed when the hop is persistent. Further, the touchdown protection torque may mitigate incorrect touchdowns (Zone A) for false-positive hop by allowing the touchdown device to have a smooth transition from use to no use.

Figure 6:
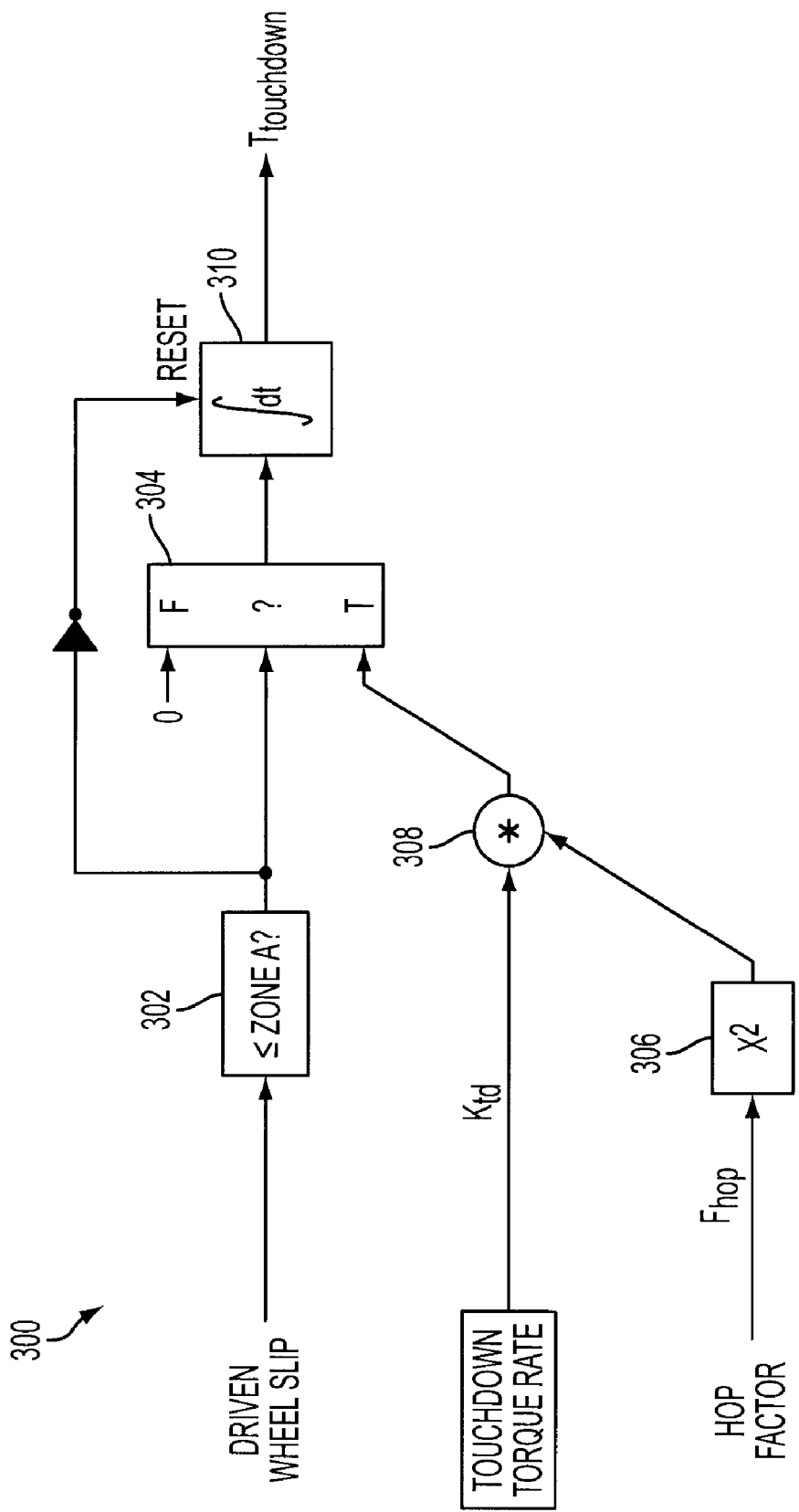
FIG. 6 is a schematic control diagram, illustrating an exemplary control algorithm to determine touchdown protection torque according to the present disclosure.

Now referring to FIG. 6, a schematic control diagram 300 is shown to illustrate an exemplary control algorithm to determine touchdown protection torque according to the present disclosure. In some embodiments, the touchdown protection torque may be used to control the torque when a vehicle is operating at Zone A. At block 302, a driven wheel slip is compared with a slip threshold to determine whether the vehicle is operating in Zone A. If it is false, a value of zero is input to block 304. If it is true, a value related to a hop factor and touchdown rate is input to 304. The value is obtained by squaring the hop factor, $F_{hop}$, at 306 and multiplying the touchdown torque rate, $K_{td}$, at 308. The value from block 304 is then integrated at block 310 to obtain the touchdown protection torque. The following equations may describe control algorithm 300 illustrated in FIG. 6.

If slip≦Zone A, then $$T_{touchdown} = \Sigma \Delta t \cdot K_{td} \cdot F_{hop}^2 \quad (8)$$

If slip>Zone A, then $$T_{touchdown} = 0 \quad (9)$$

As described above, touchdown protection torque may be incorporated to proportional control mode and integral control mode to reduce the hop.

Figure 7:
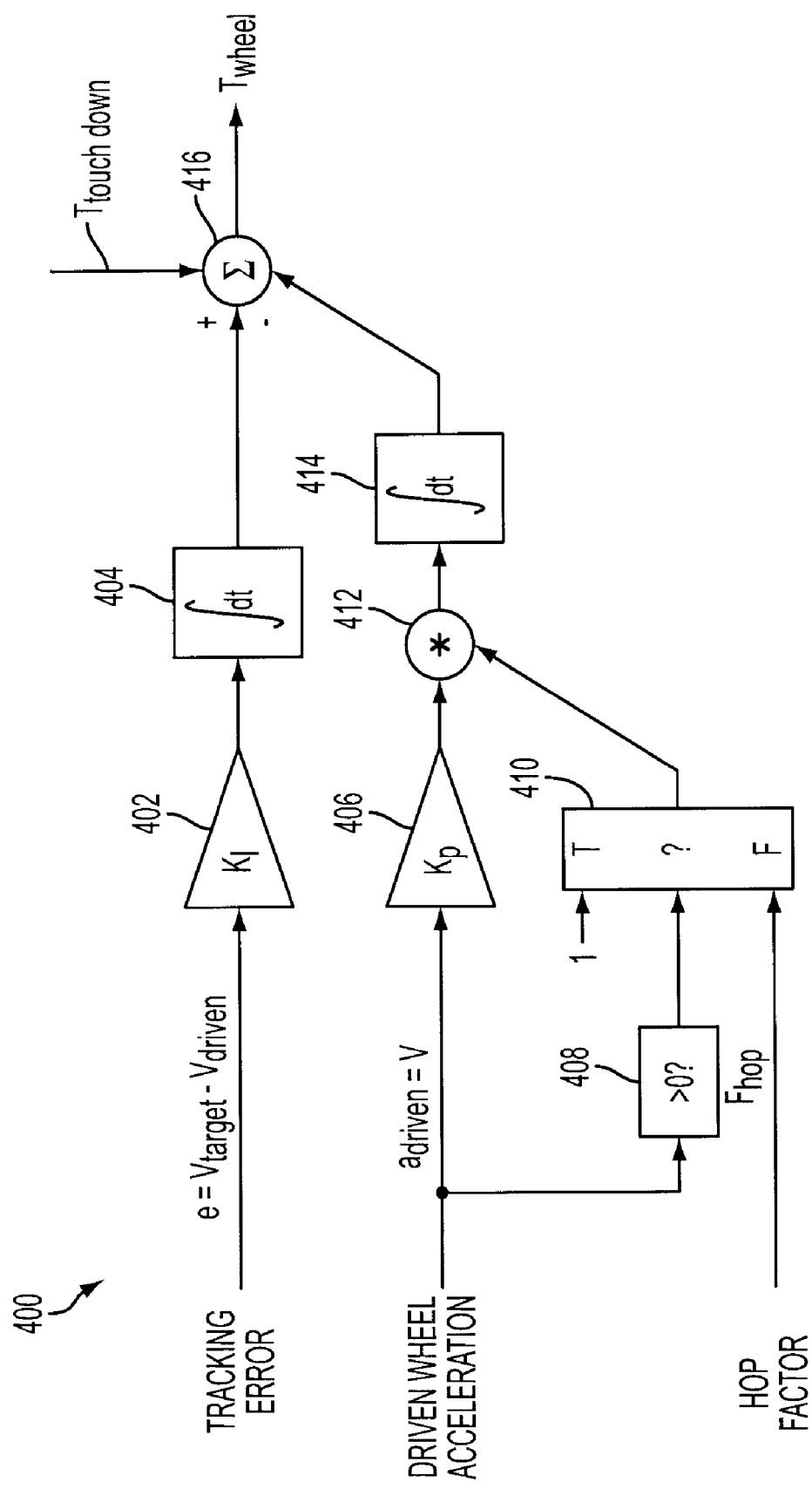
FIG. 7 is a schematic control diagram, illustrating an exemplary control algorithm for an example control mode to reduce the hop according to the present disclosure.

FIG. 7 is a schematic control diagram 400 illustrating an exemplary control algorithm for an example control mode to reduce the hop according to the present disclosure. In some integral modes, such as a proportional-derivative (P-D) integrated to proportional integral (P-I), the torque or the vehicle acceleration may potentially get directly out of phase with the hop condition and further excite the hop. To counteract this effect, control algorithm 400 may be implemented to reduce the hop. As shown in FIG. 7, a tracking error may be input to block 402 and multiplied by integral constant, $K_I$ at block 402. The tracking error may represent a wheel speed change. In some embodiments, the tracking error may be a difference between a slip target, $V_{target}$, and wheel speed of driven wheels, $V_{driven}$. The slip target may be a modified slip target based on a hop level and a road condition. The output from block 402 may be integrated at integration block 404 to obtain an error term in the control algorithm.

Additionally, a damping function may be incorporated into control algorithm 400 to reduce the torque in order to mitigate the hop. In some embodiments, the damping may be responsive to an acceleration of driven wheels and a direction of the acceleration. As shown in FIG. 7, the driven wheel acceleration, $a_{driven}$, is input into block 406 and is multiplied by a proportional constant, $K_p$ at block 406.

Control algorithm 400 may determine the direction of the acceleration at block 408. For example, block 408 may determine whether the acceleration is greater than zero. If it is true, a value of 1.0 is input into block 410. If it is false, a hop factor, $F_{hop}$, is input into block 410. The output from block 410 may be multiplied by the output from block 406 at block 412 and then is integrated at integration block 414 to obtain a damping term in the control algorithm. At summation block 416, an output from integration block 404 may be added and an output from integration block 414 may be subtracted to obtain wheel torque, $T_{wheel}$. Additionally, or alternatively, in some embodiments, touchdown protection torque, $T_{touchdown}$ may be added at block 416.

The control algorithm described above may be described by the following equations:

If $a_{driven} \geq 0$, then $$T_{wheel} = \Sigma [K_I \cdot \Delta t \cdot (V_{target} - V_{driven}) - K_p \cdot \Delta t \cdot a_{driven}] \quad (10)$$

If $a_{driven} < 0$, then $$T_{wheel} = \Sigma [K_I \cdot \Delta t \cdot (V_{target} - V_{driven}) - K_p \cdot \Delta t \cdot a_{driven} \cdot F_{hop}] \quad (11)$$

Additionally, or alternatively, touchdown torque, $T_{touchdown}$, may be added to equations (10) and (11) if the condition for the addition is satisfied.

As described by control algorithm and equation (10), when the wheels are accelerated up (i.e., $a_{driven} \geq 0$), the damping term (the second term in the equation (10)) is the base or the negative torque is added to the wheel torque. As shown by the equation (10), if the driven wheels are accelerated up, the wheel torque may be adjusted independent of the hop level or the hop factor. Thus, wheel torque may be significantly reduced.

However, as described by control algorithm and equation (11), when the wheels are slowed down, the damping term is multiplied by the hop factor, $F_{hop}$. Thus, the wheel torque adjustment is proportional to the hop level. As shown by equation (11), even if the driven wheels are decelerated, wheel torque decreases as the hop level increases (note that $F_{hop}$ decreases as the hop level increases). In this way, under some conditions, torque reduction may be one-side damping, i.e., the wheel torque decreases as the hop level increase. It should be noted that under some conditions where the hop may be insignificant (e.g., $F_{hop}=1$), control mode may perform a two-side damping based on the direction of driven wheel acceleration.

The system and method described above are advantageous in controlling the hop. For example, hop detection may be possible through processing wheel speed signals by a powertrain control system without addition of expensive computing components and algorithm. Further, the signal processing is adapted to the hop control modes such that the control modes may be implemented in accordance with the detected hop level.

Moreover, control modes may be selectively implemented for reducing hop depending on specific vehicles and vehicle operating conditions. For example, under certain circumstances, a hop control mode may effectively reduce the hop in a short time interval for a specific type of vehicle. In another example, under some conditions, an integrated control mode may prevent or reduce the significant hop excited by implementing the torque control. For example, wheel acceleration may be out-of-phase due to torque additions under some conditions. The integrated control mode may reduce the wheel torque as the hop level increases even when wheels are decelerated. In this way, the wheel speed is encouraged to return to a slip level that is desired to reduce the significant hop. Thus, significant vehicle hop may not be excited by the powertrain control system.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a powertrain of a vehicle with wheels during a traction control event, the method comprising:

adjusting wheel torque in response to an amplitude of a band-pass filtered driven wheel speed and a direction of acceleration of driven wheels, wherein adjusting wheel torque includes adding a negative torque to the wheels if the wheel acceleration is greater than zero, and wherein adjusting wheel torque includes adding a torque to the wheels if the wheel acceleration is less than zero, where the added torque decreases as the amplitude increases.

2. The method of claim 1, wherein a negative torque is added to the wheels if the amplitude is greater than a threshold.

3. The method of claim 2, further comprising modifying a slip target based on the amplitude and a road condition, where the slip target is increased with increasing hop for a first road condition, and the slip target is decreased with increasing hop for a second road condition.

4. The method of claim 3, further comprising adjusting the wheel torque based on a wheel speed change wherein the wheel speed change is a difference between a modified slip target and a wheel speed.

5. The method of claim 1, wherein adjusting the wheel torque further includes adding a touchdown torque to the wheels if a wheel slip is less than a threshold.

6. The method of claim 1, wherein driven wheel speeds are sampled by a band-pass filter at a sample spacing greater than 1.5 radians.

7. The method of claim 1, wherein a center frequency of a band-pass filter is adjusted based on one of road surface condition, vehicle operating condition, and vehicle configuration.

8. The method of claim 7, wherein the road surface condition includes friction coefficient of surface-tire interaction.

9. The method of claim 7, wherein the vehicle operating condition includes a vehicle speed.

10. The method of claim 7, wherein the vehicle configuration includes one of a transmission gear ratio and an estimated vehicle weight.

11. A method for controlling a powertrain of a vehicle with wheels during a traction control event, the method comprising:

detecting a hop level by processing signals of driven wheel speed;

adjusting wheel torque in a first direction and in a first proportion to a wheel slip change when an acceleration of driven wheels is greater than zero; and adjusting the wheel torque in a second direction and in a second proportion to the wheel slip change when the acceleration is less than zero, wherein the second proportion is adjusted responsive to the hop level.

12. The method of claim 11, wherein adjusting the wheel torque in the first direction includes adding a negative torque to the wheel torque and the first proportion is independent of the hop level.

13. The method of claim 11, wherein adjusting the wheel torque in the second direction includes adding a torque to the wheel torque and the second proportion is adjusted to decrease as the hop level increases.

14. The method of claim 11, wherein adjusting the wheel torque includes adding a touchdown torque to the wheels if a wheel slip is less than a threshold.

15. The method of claim 11, wherein the signals of driven wheel speed are processed by a band-pass filter and a low pass filter to produce signals indicative of the hop level wherein a sampling spacing of the band-pass filter is greater than 1.5 radians and the low pass filter includes two time constants.

16. A method for controlling a powertrain of a vehicle with wheels during a traction control event, the method comprising:

adjusting wheel torque responsive to a gain, a wheel speed error, and an acceleration of driven wheels, where the gain is adjusted based on a hop level, a direction of the wheel speed error, and a direction of the acceleration.

17. The method of claim 16, wherein the wheel speed error is a difference between a slip target and a driven wheel speed.

18. The method of claim 16, wherein a touchdown torque is added to the wheel torque when a wheel slip is less than a slip threshold and a duration for the hop is less than a time threshold.

* * * * *